(12) United States Patent
Barkan et al.

(10) Patent No.: US 12,277,841 B1
(45) Date of Patent: Apr. 15, 2025

(54) INDICIA READERS WITH INTERNAL DISPLAYS

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US); Matthew Lawrence Horner, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/385,679

(22) Filed: Oct. 31, 2023

(51) Int. Cl.
*G07G 1/00* (2006.01)

(52) U.S. Cl.
CPC ......... *G07G 1/0045* (2013.01); *G07G 1/0018* (2013.01)

(58) Field of Classification Search
CPC .................... G07G 1/0045; G07G 1/0018
See application file for complete search history.

(56) References Cited

U.S. PATENT DOCUMENTS

| | | | | |
|---|---|---|---|---|
| 2019/0180264 | A1* | 6/2019 | Crooks | H04N 7/183 |
| 2021/0326821 | A1* | 10/2021 | Singh | G07G 1/0018 |
| 2023/0004737 | A1* | 1/2023 | Drzymala | G06K 7/1096 |
| 2024/0211912 | A1* | 6/2024 | Johnson | G06Q 20/204 |

* cited by examiner

Primary Examiner — Kristy A Haupt
(74) Attorney, Agent, or Firm — Yuri Astvatsaturov (57) ABSTRACT

Indicia readers with internal displays are disclosed herein. In an embodiment, an indicia reader includes a housing having a lower portion and an upper portion, the lower portion having a first window positioned in a generally horizontal plane, the top portion having a second window positioned in a generally upright plane. The reader further includes an imaging assembly positioned within the housing, the imaging assembly configured to capture image data associated with an item presented at a product-scanning region of the bi-optic reader. Additionally, the reader includes a user-interface (UI) display positioned within the housing, the UI display configured to present visual data to an operator of the bi-optic reader, wherein the visual data includes data associated with the item presented at the product-scanning region of the bi-optic reader.

21 Claims, 8 Drawing Sheets

INDICIA READERS WITH INTERNAL DISPLAYS

BACKGROUND

Indicia reader have traditionally been employed largely as feedbackless data capture devices. This is because they are commonly used in conjunction with more capable equipment like point-of-sale systems that act as user-interface points. Consequently, indicia readers, like bi-optic barcode readers or slot scanners, normally provide very limited feedback, typically going only as far as to provide an auditory beep or a visual flash indicating a successful decode. However, the inventors foresee future uses where additional feedback from the indicia reader is desired. Thus, there is a need for novel designs for feedback systems associated with indicia readers.

SUMMARY

Accordingly, at least some embodiment of the present disclosure relate to novel designs for feedback systems associated with indicia readers.

In an embodiment, the present invention is a bi-optic reader comprising: a housing having a lower portion and an upper portion, the lower portion having a first window positioned in a generally horizontal plane, the top portion having a second window positioned in a generally upright plane; an imaging assembly positioned within the housing, the imaging assembly configured to capture image data associated with an item presented at a product-scanning region of the bi-optic reader; a user-interface (UI) display positioned within the housing, the UI display configured to present visual data to an operator of the bi-optic reader, wherein the visual data includes data associated with the item presented at the product-scanning region of the bi-optic reader.

In a variation of this embodiment, the bi-optic reader further includes a first optical element and a second optical element, each positioned within the upper portion of the housing, wherein each of the first optical element and the second optical element is associated with a respective field of view that is directed at the product-scanning region of the bi-optic reader, and wherein the UI display is positioned between the first optical element and the second optical element.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

Figure 1:
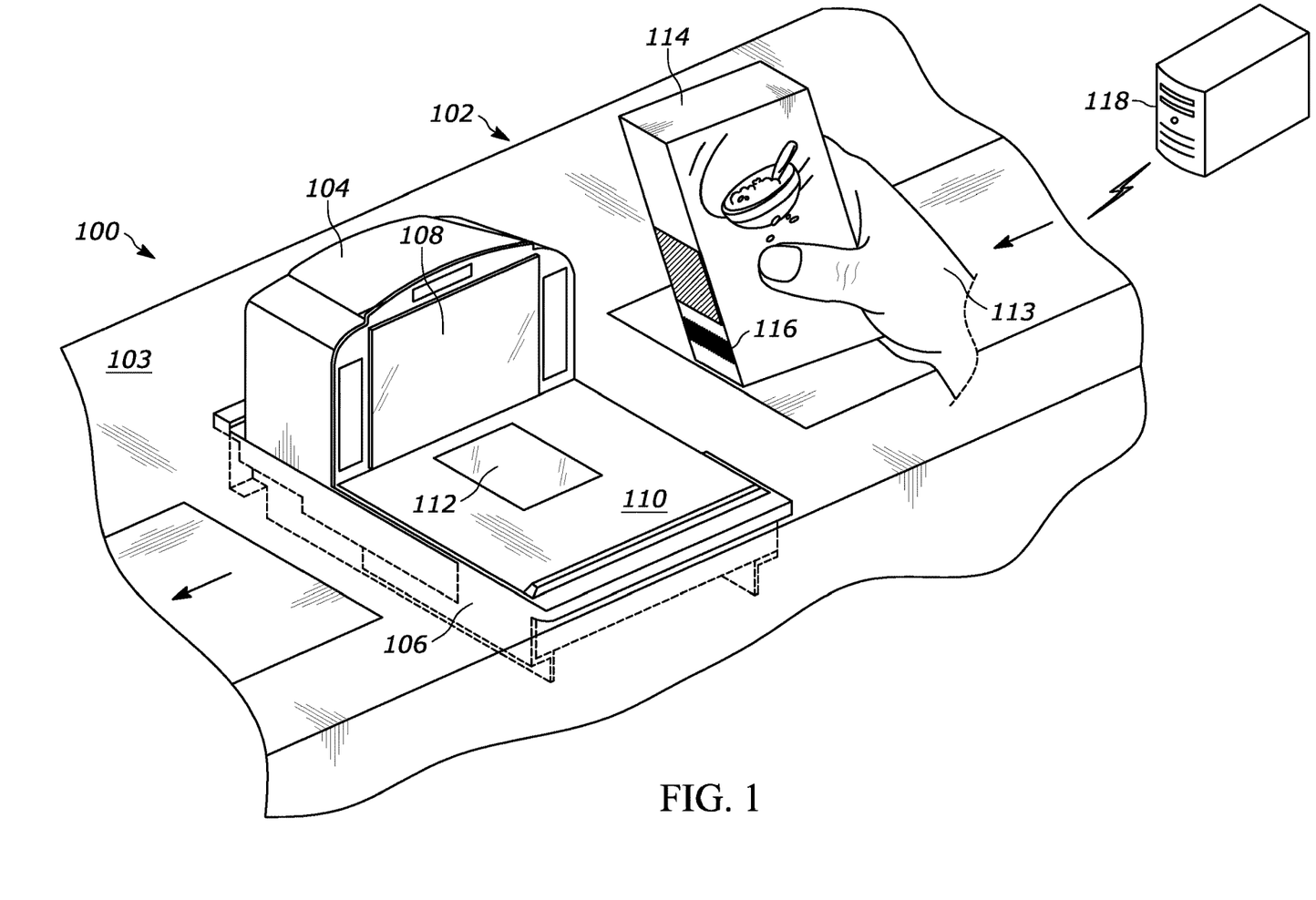
FIG. 1 is a perspective view of an example barcode reader that may be used to implement inventive concepts described here.

FIG. 1 illustrates a perspective view of an example bioptic indicia reader 100 operable to provide various feedback configurations in accordance with embodiments of the present disclosure. As used herein, the term indicia should be understood to refer to any kind of visual marker that can be associated with an item. For example, indicia can be a 1D, 2D, or 3D barcode, a graphic, a logo, etc. Additionally, indicia may comprise encoded payload data as, for example, is the case with a 1D or 2D barcode where the barcode encodes a payload comprised of, for example, alphanumeric or special characters that may be formed into a string. In the illustrated example, the bioptic indicia reader 100 is shown as part of a point-of-sale (POS) system arrangement 102 having the bioptic indicia reader 100 positioned within a workstation counter 103. Generally, the indicia reader 100 includes an upper housing 104 (also referred to as an upper portion, upper housing portion, or tower portion) and a lower housing 106 (also referred to as a lower portion, lower housing portion, or platter portion). The upper housing 104 can be characterized by an optically transmissive window 108 positioned therein along a generally vertical plane and a horizontally extending field of view which passes through the window 108. The lower housing 106 can be characterized by a weigh platter 110 that includes an optically transmissive window 112 positioned therein along a generally horizontal (also referred to as a transverse) plane and a vertically extending field of view which passes through the window 112. The weigh platter 110 is a part of a weigh platter assembly that generally includes the weigh platter 110 and a scale (or load cell) configured to measure the weight of an object placed the top surface of the weight platter 110. By that virtue, the top surface of the weight platter 110 may be considered to be the top surface of the lower housing 106 that faces a product scanning region there above.

In operation, a user 113 generally passes an item 114 across a product scanning region of the indicia reader 100 in a swiping motion in some general direction, which in the illustrated example is right-to-left. A product scanning region can be generally viewed as a region that extends above the platter 110 and/or in front of the window 108 where barcode reader 100 is operable to capture image data of sufficient quality to perform imaging-based operations like decoding a barcode that appears in the obtained image data. It should be appreciated that while items may be swiped past the indicia reader 100 in either direction, items may also be presented into the product scanning region by means other than swiping past the window(s). When the item 114 comes into the any of the fields of view of the reader, the indicia 116 on the item 114 is captured and decoded by the indicia reader 100, and corresponding data is transmitted to a communicatively coupled host 118 (commonly comprised of a point of sale (POS) terminal).

Indicia reader 100 can utilize a variety of imaging and optical components (collectively referred to as imaging subsystem or imaging assembly) to achieve the desired field of view(s) FOV(s) over which image data can be captured and transmitted to a processing host (such as a decoder (aka decoder subsystem), processor, or ASIC that may be internal to the indicia reader 100) for decoding of indicia and further utilization of the decoded payload data. For example, an imaging assembly may include an image sensor(s) (also referred to as an imager or imaging sensor) that can be, for example, a two-dimensional CCD or a CMOS sensor that can be either a monochrome sensor or a color sensor having, for instance 1.2 megapixels arranged in a 1200×960 pixel configuration. It should be appreciated that sensors having other pixel-counts (both below and above) are within the scope of this disclosure. These two-dimensional sensors generally include mutually orthogonal rows and columns of photosensitive pixel elements arranged to form a substantially flat square or rectangular surface. Such imagers are operative to detect light captured by an imaging lens assembly along a respective optical path or axis that normally traverses through either of the generally horizontal or generally upright window(s). In instances where multiple imaging components are used, each respective imager and imaging lens assembly pair is designed to operate together for capturing light scattered, reflected, or emitted from indicia as pixel data over a respective FOV. In other instances, a single imaging sensor may be used to generate a single primary FOV which may be split, divided, and/or folded to generate multiple FOVs by way of splitter and/or fold mirrors. In such cases, data collected from various portions of the imaging sensor may be evaluated as if it was obtained by an individual imaging assembly/imaging sensor.

Figure 2:
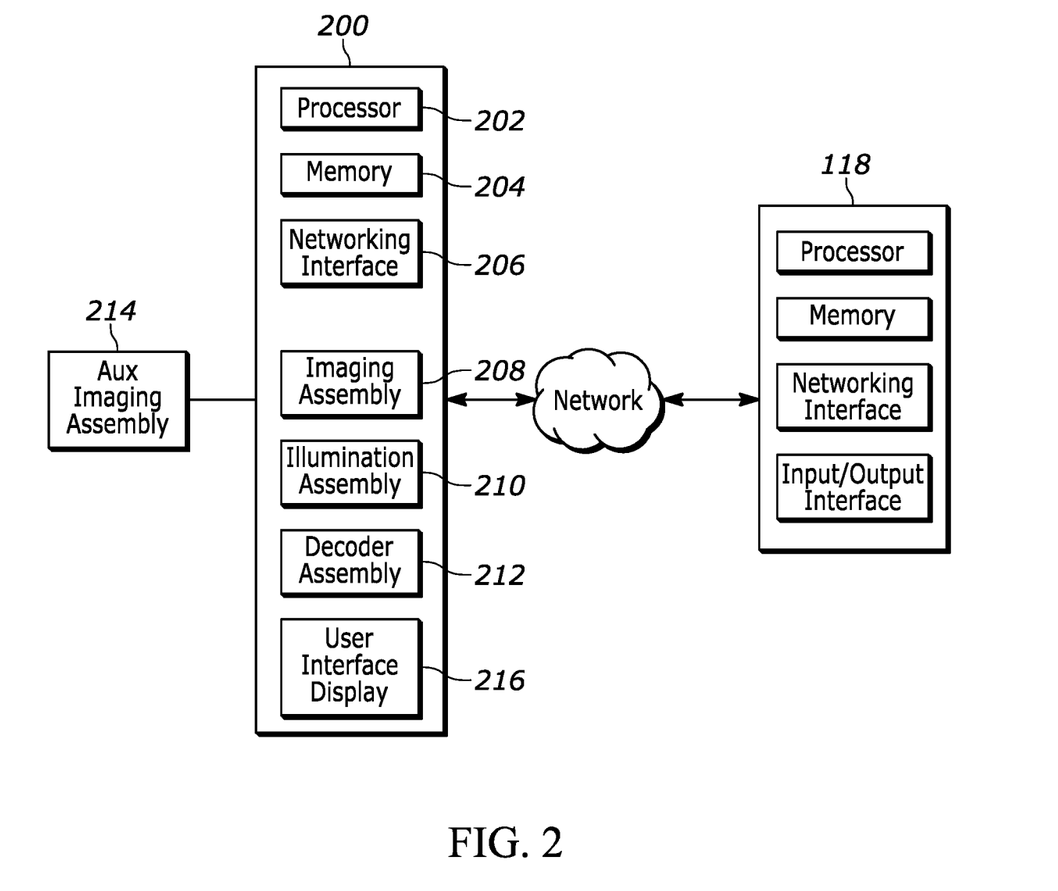
FIG. 2 is a block diagram representative of logical components of the example barcode reader of FIG. 1.

FIG. 2 is a block diagram representative of an example logic circuit capable of implementing, for example, one or more components of the example feedback systems for bioptic indicia readers described herein, along with it being communicatively coupled to a POS station (also referred to as a host). The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes at least one processor 202 such as, for example, one or more microprocessors, controllers, and/or any suitable type of processor. The example processing platform 200 of FIG. 4 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations described herein. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 2 also includes a network interface 206 to enable communication with other machines via, for example, one or more networks. The example network interface 206 includes any suitable type of communication interface(s) (e.g., wired and/or wireless interfaces) configured to operate in accordance with any suitable protocol(s).

Additionally, the example processing platform 200 of FIG. 2 also includes an imaging assembly 208, an illumination assembly 210, and a decoder assembly 212. Generally speaking, the processor 202 is operable to control the imaging and illumination assemblies to illuminate objects and capture relevant image data, and to cause that data to be processes through the decoder assembly to obtain payload(s) is indicia that may be present therein. It should be appreciated that the decoder assembly may be seen as being part of the at least on processor 402. Also, the processing platform 200 may also have, associated therewith, an auxiliary imaging assembly 214 that is positioned outside the housing of the platform 200. Assembly 214 may be provided to capture data associated with operations that relate to the use of the platform 200.

Further to the above, the example, processing platform 200 of FIG. 2 includes a user-interface (UI) display 214 that operates to provide feedback, in accordance with various embodiments of the present disclosure, to an operator of the platform 200.

Figure 3:
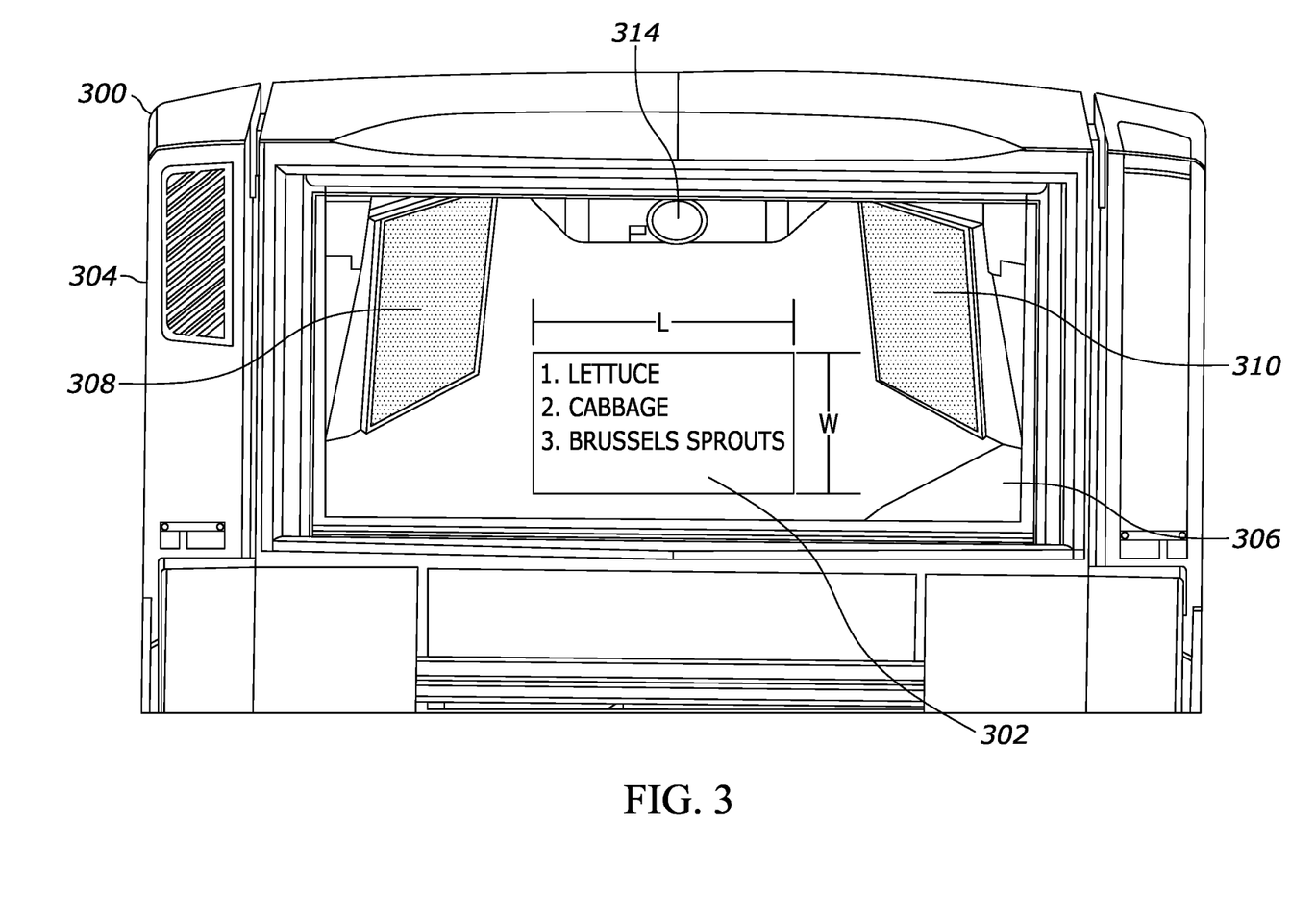
FIG. 3 illustrates a partial front view of an indicia reader in accordance with an embodiment of the present disclosure.
Figure 4:
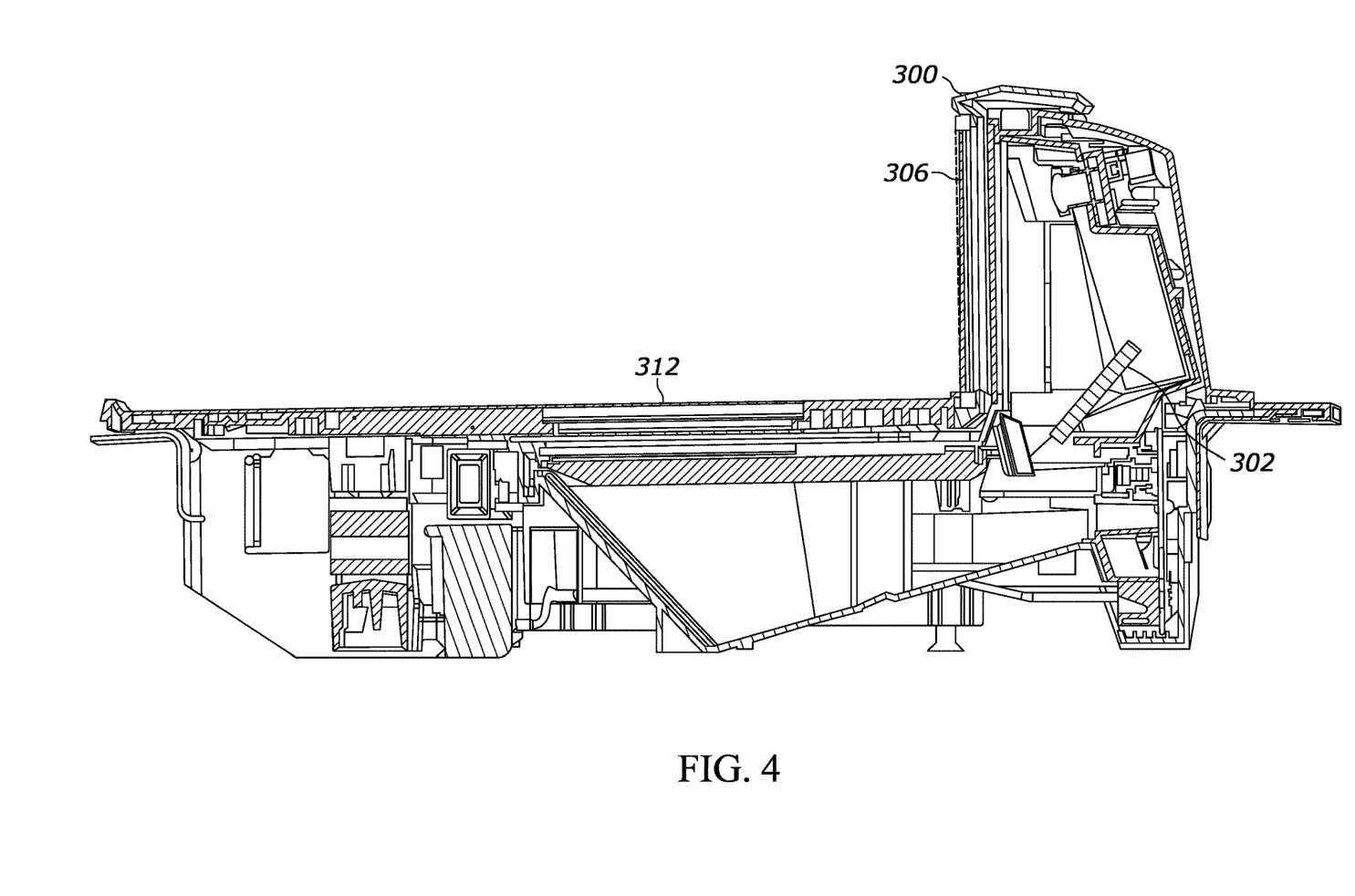
FIG. 4 illustrates a side cut-away block diagram of the reader of FIG. 3.

Referring to FIGS. 3 and 4, shown therein is an example implementation of a UI display within the bi-optic reader 300. Specifically, the UI display 302 is positioned within the upper portion of the housing 304 behind the upright window 306. In preferred configurations, the display 302 is relatively easily viewable by an operator of the reader 300. Thus, in some embodiments it is positioned closer to the center of the upper housing 304.

In some cases, such placement may be advantageous as the reader 300 can include a series of optical elements within the upper housing that require obstruction-free optical paths to the product-scanning region of the reader 300. In the illustrated example, these optical elements are embodied in the left and right fold mirrors 308 and 310. These mirrors are utilized to fold the paths of the respective fields-of-view (FOV) that are associated with each mirror such that each FOV traverses between the interior of the reader 300 and the product-scanning region. To avoid obstructing the FOVs, the display 302 is positioned between each mirror 308 and 310. In some embodiments the display has a length and a width such that the length L is between 35 millimeters and 85 millimeters, and the width W is between 30 millimeters and 65 millimeters. In alternate embodiments the optical element may include one or more image sensors like that which would be used by the imaging assembly. Conversely, these sensors may be considered to be a part of the overall imaging assembly of the reader 300.

Additionally, the display 302 may be positioned closer to the bottom portion of the window 306 and it may be tilted, or obliquely angled (see FIG. 4) relative to the platter window 312. In some examples, the display 302 may be positioned such that the generally horizontal plane, in which the platter window 312 sits, intersects with the UI display 302. This may be advantageous where the reader 300 includes another imaging sensor 314 (also referred to as another imaging assembly or considered to be a part of the collective imaging assembly of the reader 300) positioned closer to the top portion of the window 306 and between the optical elements 308 and 310. In some examples, the imaging assembly 314 may be configured to capture data vision data and to help perform operations other than (though possibly in addition to) indicia decoding. Specifically, image data from this assembly may be used to help visually identify items presented into the product-scanning region of the indicia reader and/or to monitor the operator of the reader.

Figure 5:
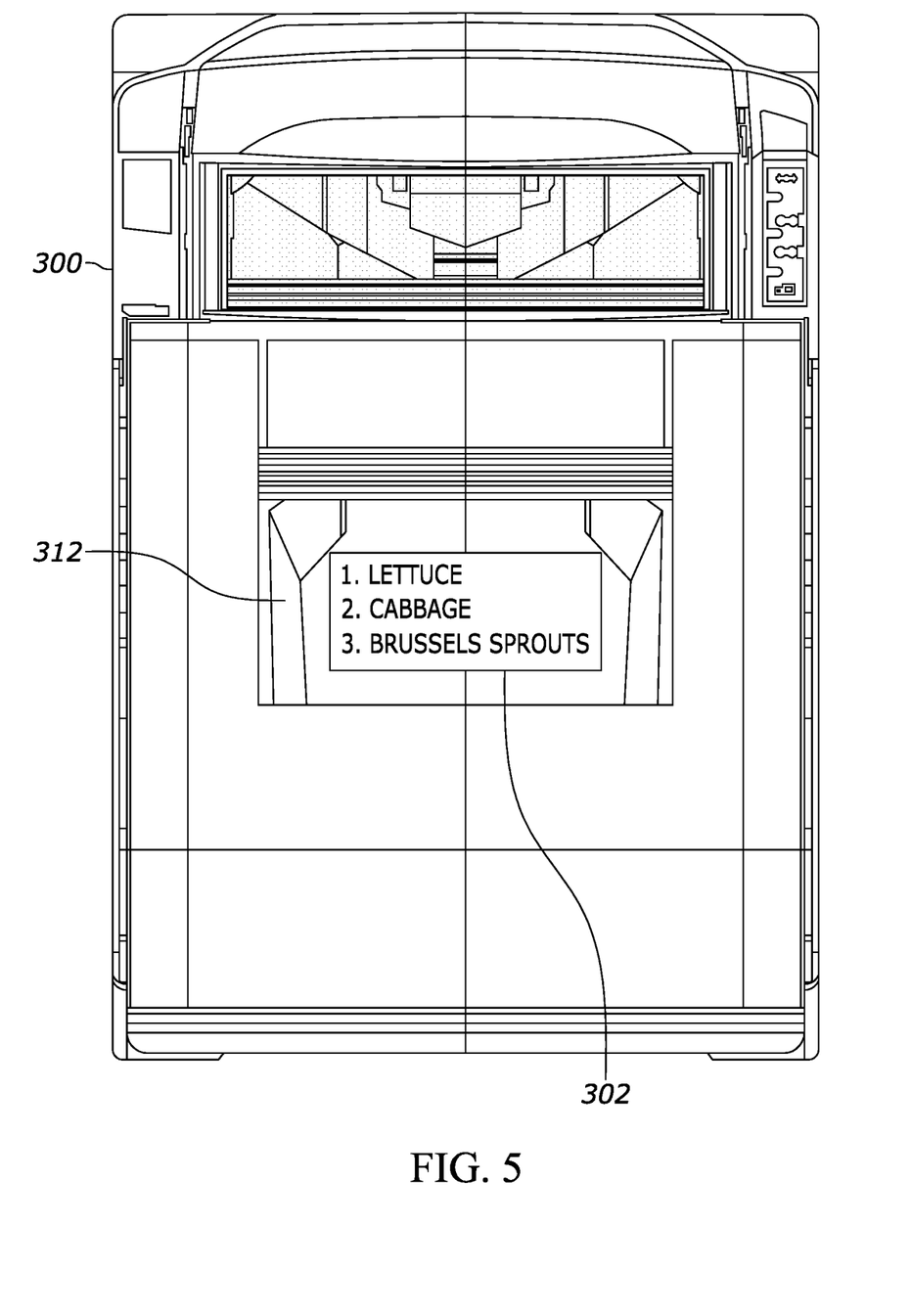
FIG. 5 illustrates a top view of an indicia reader in accordance with an embodiment of the present disclosure.
Figure 6:
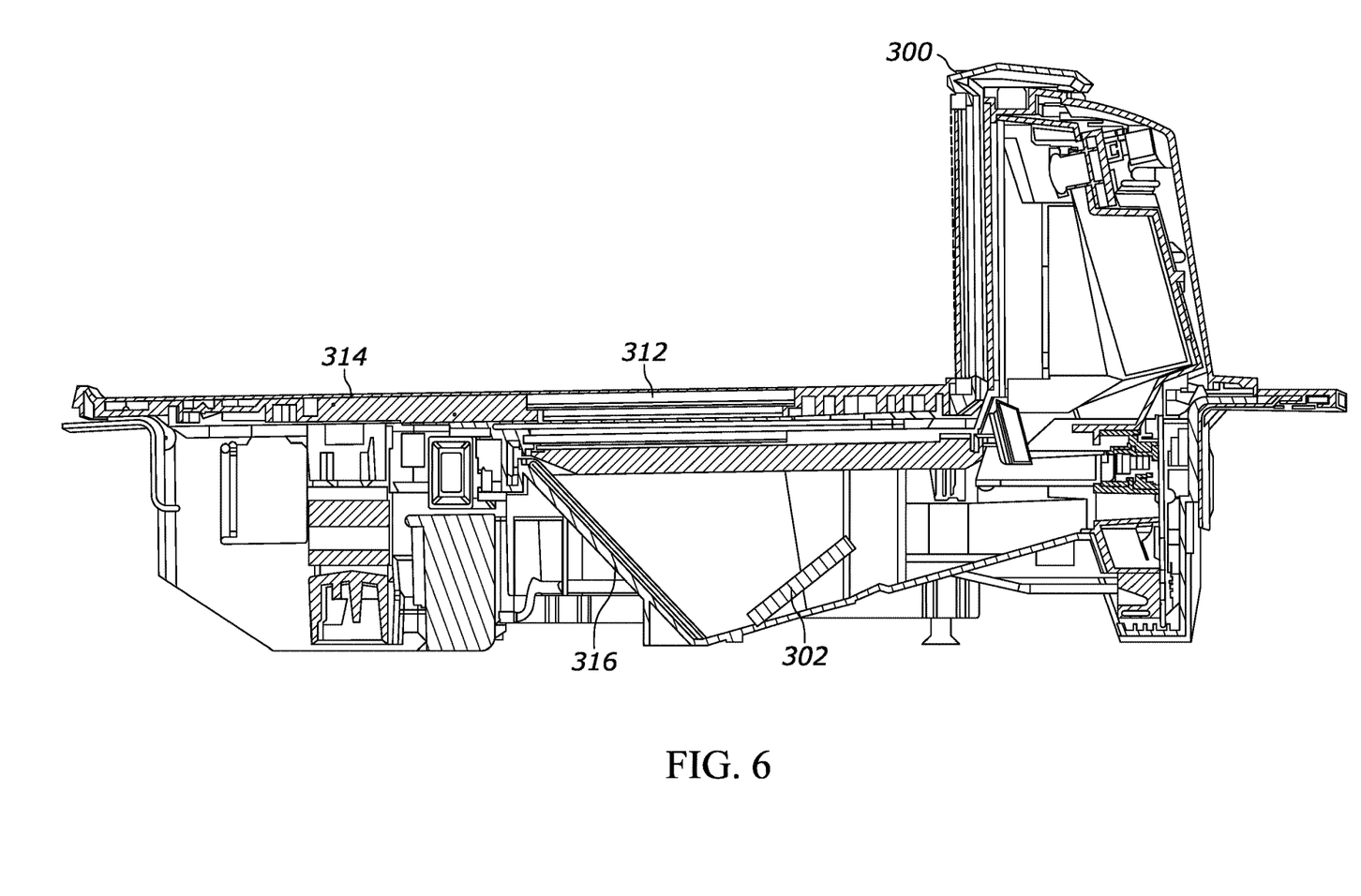
FIG. 6 illustrates a side cut-away block diagram of the reader of FIG. 5.

An alternate embodiment of the reader 300 is provided in FIGS. 5 and 6 where the display 302 is positioned within the lower portion of the housing 314 below the platter window 312. In this implementation, the lower portion 314 can include an optical element 316 (e.g., a fold mirror) associated with the imaging assembly, and the UI display 302 can be positioned between the optical element 316 and the upper portion of the housing. In this manner, an operator standing at the base of the reader 300 would still be able to view the data presented on the display.

To help avoid obstructing any fields of view that may be traversing the lower portion of the housing 14, the UI display 302 may be angled and/or positioned in a position-appropriate manner. For example, the UI display 302 may be positioned flat (i.e., parallel to the window 312) within the bottom of the lower portion below any fields of view. An appropriate cavity may be provided within the housing structure to accommodate such positioning. Alternatively, the bottom portion of the lower portion 314 may include a transparent window below which the UI display may be installed in a separate compartment of the overall indicia reader housing or a separate compartment that can allow for field-upgradeability of the this display. Additional modifications can include angular changes to that arrangement which can help bias the display towards the operator's face. Thus, while the display 302 may be parallel relative to the window 312, it does not have to be.

Additionally, in some implementations the reader may be configured such that a fold mirror is positioned between UI display and one of the platter or the tower window. In this case, to be able to observe the information presented on the display, the fold mirror is operative selectively to transmit and reflect light. For instance, a transflective fold mirror may be employed where the mirror is periodically switched between a reflective and a transmissive state.

Figure 7A:
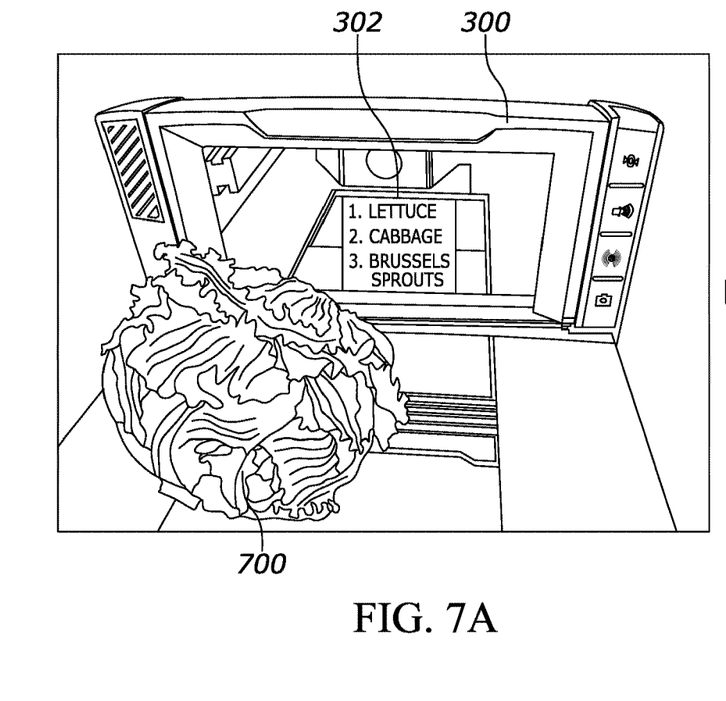
FIGS. 7A and 7B illustrate an example indicia reader in use with an item in the product-scanning region.

The UI display described herein may be used to present a wide range of information. As an example, data presented on the display may be associated with items presented at the product-scanning region of the reader. For instance, as shown in FIG. 7A, during an item identification session an item an item 700 may be placed on the platter of the reader. The reader 300, via its one or more processors, can analyze image data collected by its imaging assembly to determine possible candidate items for the item presented to the reader and display its top choices in the display 302. Similarly, the display may provide weight data, quantity information, or other characteristics associated with the item.

In some instances, it may be preferable to provide other visual data on the display 302. For example, video data streamed from any of the imaging components of the reader may be provided on the display. This can provide some indication to the operator their actions may be monitored and assist with deterring actions that may result in theft or shrink. Additionally, image or vide data may be provided where such data is collected from an auxiliary imaging assembly that is positioned external to the reader 300. For example, an auxiliary imaging assembly may be positioned nearer the floor and configured to monitor a bottom region of a cart. Upon recognizing that items are present in the bottom of the cars, visual data representing this may be provided on the display to remind the operator that additional items may need to be scanned. In other cases, the display may provide data related to the configuration of the scanner.

Figure 7B:
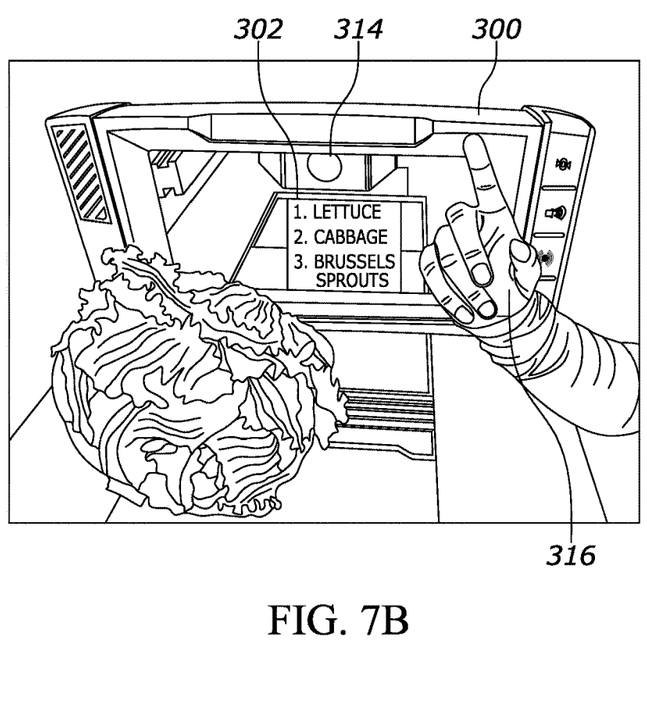

In some cases the reader 300 may be configured to interact with the information provided on the display 302. For example, after placing the item 700 on the platter, the reader may display a series of item candidates on the display 302. To select any one of the three options presented, the reader can be configured to recognize the operator's 316 gestures such that a presentation of a number 1 (see FIG. 7B) can be interpreted by the reader as a selection of item #1 provided on the display. This can be achieved by monitoring image data from, for example, imaging assembly 314, and identifying the various gestured provided by the operator. Once the selection is made and an item has been fully identified, identifying data associated with that item (e.g., e price look-up code) can be transmitted to a host like a POS.

Additionally, the reader can be configured to recognize other gestures that would be interpreted as inputs to the options presented on the display 302 (for example, a visual observation of a user touching any portion of a reader like the window).

Figure 8:
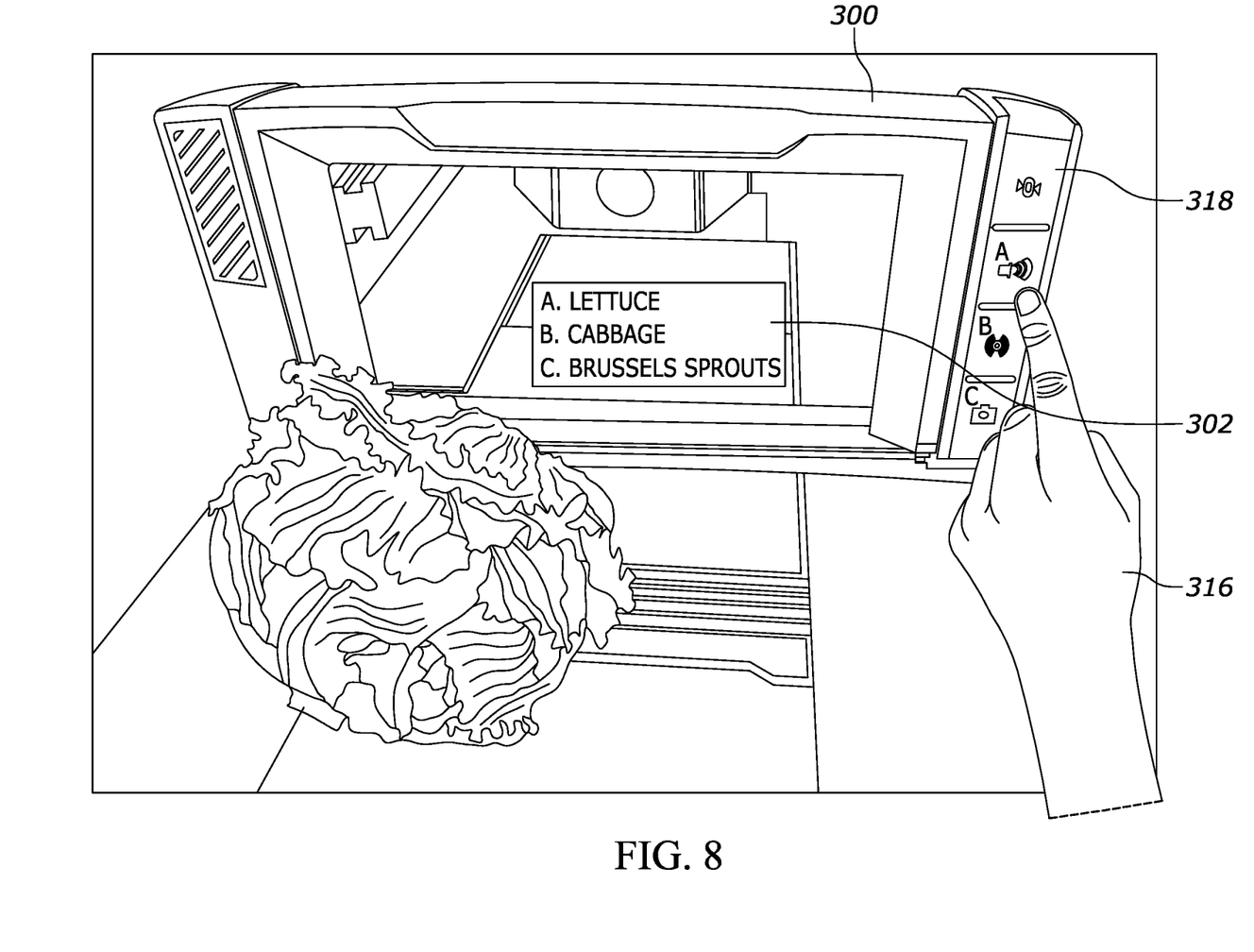
FIG. 8 illustrates an example indicia reader in use with an item in the product-scanning region.

Another example of operator interaction is illustrated on FIG. 8 where a panel 318 is provided on a portion of a reader that is physically reachable by the operator 316. The panel may provide an array of static or dynamic input options that can correspond to the options presented on the display. In this manner, when the selections A, B, and C appear on the display 302, a corresponding selection of options may appear on the panel 318. At that point the user may select the appropriate selection and allow the reader to proceed with transmitting the appropriate data to the host.

In some cases, special consideration is paid to the need to synchronize the illumination of the UI display 302 and the imaging components of the reader. This may be necessary where light from the display may be reflected off the window and toward the imaging sensor(s), creating undesired artifacts in captured image data. To avoid this, the illumination of the display 302 may be activated during non-exposure periods of the imaging assembly. In this manner, light generated by the display, even if reflected toward the imaging assembly, does not register in the captured image data.

Finally, it should be appreciated that while the above description has been provided with respect to a bi-optic indicia reader configuration, inventive concepts surrounding the providing of the UI display inside an indicia reader housing may extend to other configurations. For example, single-window slot scanner, hands-free scanners, handheld scanners, and fixed mount scanners are all within the scope of the present disclosure.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bi-optic reader comprising:
a housing having a lower portion and an upper portion, the lower portion having a first window positioned in a generally horizontal plane, the top portion having a second window positioned in a generally upright plane;
an imaging assembly positioned within the housing, the imaging assembly configured to capture image data associated with an item presented at a product-scanning region of the bi-optic reader;
a user-interface (UI) display positioned within the housing, the UI display configured to present visual data to an operator of the bi-optic reader, wherein the visual data includes data associated with the item presented at the product-scanning region of the bi-optic reader.

2. The bi-optic reader of claim 1, further comprising at least one processor configured to determine item data based on the image data captured by the imaging assembly, wherein the visual data presented to the operator of the bi-optic reader is based, at least in part, on the item data determined by the at least one processor.

3. The bi-optic reader of claim 1, further comprising a first optical element and a second optical element, each positioned within the upper portion of the housing,
wherein each of the first optical element and the second optical element is associated with a respective field of view that is directed at the product-scanning region of the bi-optic reader, and
wherein the UI display is positioned between the first optical element and the second optical element.

4. The bi-optic reader of claim 3, wherein at least one of the first optical element and the second optical element includes a fold mirror.

5. The bi-optic reader of claim 3, wherein at least one of the first optical element and the second optical element includes an image sensor.

6. The bi-optic reader of claim 3, wherein the upper portion includes a cavity behind the second window that is visible to the operator, and wherein the UI display is positioned within the cavity such that it is closer to a bottom boundary of the second window than a top boundary of the second window.

7. The bi-optic reader of claim 3, wherein the UI display is obliquely angled relative to the first window.

8. The bi-optic reader of claim 3, wherein UI display is positioned such that the generally horizontal plane intersects with the UI display.

9. The bi-optic reader of claim 3, wherein UI display has a length between 55 mm and 85 mm, and a width between 30 mm and 65 mm.

10. The bi-optic reader of claim 3, wherein the imaging assembly includes an image sensor positioned above the UI display and further between the first optical element and the second optical element.

11. The bi-optic reader of claim 10, wherein the image sensor is configured to capture second image-data associated with at least one of (i) the item presented at the product-scanning region of the bi-optic reader or (ii) the operator of the bi-optic reader.

12. The bi-optic reader of claim 11, further comprising at least one processor,
wherein the second image-data is associated with the operator of the bi-optic reader, and
wherein the at least one processor is configured to analyze the second image-data to determine at least one gesture of the operator of the bi-optic reader.

13. The bi-optic reader of claim 12, wherein the visual data further includes data determined based on the at least one gesture of the operator of the bi-optic reader.

14. The bi-optic reader of claim 12, wherein, responsive to determining the at least one gesture of the operator, the at least one processor is further configured to transmit a message to an external host, the message being based at least partially on the at least one gesture of the operator.

15. The bi-optic reader of claim 11, wherein the visual data includes one or more frames of the second image-data captured by the image sensor.

16. The bi-optic reader of claim 1, wherein the visual data includes data associated with a weight of the item presented at the product-scanning region of the bi-optic reader.

17. The bi-optic reader of claim 1, wherein the visual data includes data associated auxiliary image data captured by an external imaging assembly, the external imaging assembly being positioned outside the housing.

18. The bi-optic reader of claim 1, wherein the UI display is positioned below the first window.

19. The bi-optic reader of claim 18, wherein the lower portion includes an optical element associated with the imaging assembly, and wherein the UI display is positioned between the optical element and the upper portion of the housing.

20. The bi-optic reader of claim 1, wherein a fold mirror is positioned between UI display and one of the first window or the second window, and wherein the fold mirror is operative selectively to transmit and reflect light.

21. The bi-optic reader of claim 1, wherein the imaging assembly has, associated therewith, an exposure period and a non-exposure period, and
wherein the UI display is configured to be (i) active during the non-exposure period and (ii) inactive during the exposure period.

* * * * *